(12) United States Patent
Daugherty et al.

(10) Patent No.: US 12,396,592 B2
(45) Date of Patent: Aug. 26, 2025

(54) FOOD TRAY CHAFING STAND WITH HINGING LEGS

(71) Applicant: Brown Bag LLC, Knoxville, TN (US)

(72) Inventors: Daniel Daugherty, Knoxville, TN (US); Jeff Roesmann, Knoxville, TN (US); Glen Theusch, Knoxville, TN (US); Jason Wiegand, Knoxville, TN (US); Albion Wisler, Knoxville, TN (US)

(73) Assignee: UPCYCLE STANDS, LLC, Knoxville, TN (US)

( * ) Notice: Subject to any disclaimer, the term of this patent is extended or adjusted under 35 U.S.C. 154(b) by 0 days.

(21) Appl. No.: 18/588,658

(22) Filed: Feb. 27, 2024

(65) Prior Publication Data
US 2024/0306845 A1  Sep. 19, 2024

Related U.S. Application Data

(60) Provisional application No. 63/490,262, filed on Mar. 15, 2023.

(51) Int. Cl.
*A47J 36/24* (2006.01)
*A47J 36/34* (2006.01)
*A47J 47/16* (2006.01)

(52) U.S. Cl.
CPC .............. *A47J 36/34* (2013.01); *A47J 47/16* (2013.01); *A47J 36/24* (2013.01)

(58) Field of Classification Search
CPC ........ A47J 36/34; A47J 36/24; A47J 36/2405; A47J 36/20; A47J 36/22; A47J 36/26; A47J 47/16; A47J 37/07; A47J 37/0694; A47J 2037/0777; A47J 39/02; A47J 39/025

USPC ................ 248/150; 126/33, 50; 99/482, 483
See application file for complete search history.

(56) References Cited

U.S. PATENT DOCUMENTS 2,024,259 A * 12/1935 Troeber .................. A47J 36/24
126/33
2,101,965 A * 12/1937 Trees ........................ G09F 7/10
40/611.05
2,388,192 A * 10/1945 Stechbart ............. F16M 13/005
248/168

(Continued)

FOREIGN PATENT DOCUMENTS

CA        700406 A    12/1964
CA       2172308 A1    9/1997

(Continued)

OTHER PUBLICATIONS

International Search Report and Written Opinion, related to PCT/US2024/017410, issued May 24, 2024 (10 pages).

*Primary Examiner* — Nkeisha Smith
(74) *Attorney, Agent, or Firm* — Robinson IP Law, PLLC (57) ABSTRACT

Various implementations include a food tray stand. The stand includes a body and two or more legs. The body has a first surface and a second surface opposite and spaced apart from the first surface. The first surface defines a tray opening extending to the second surface. The two or more legs are hingedly coupled to the body by a living hinge. Each of the two or more legs is hingedly movable between an extended position and a retracted position. Each of the two or more legs extends away from the second surface in the extended position and is at least partially disposable within the tray opening in the retracted position.

16 Claims, 7 Drawing Sheets

(56) References Cited

U.S. PATENT DOCUMENTS

| | | | | |
|---|---|---|---|---|
| 2,565,187 | A * | 8/1951 | Udell | A63F 1/06 |
| | | | | 211/195 |
| 2,903,311 | A * | 9/1959 | Earhart | A47G 23/06 |
| | | | | 211/74 |
| 3,361,126 | A | 1/1968 | Bloomfield | |
| D213,717 | S | 4/1969 | Rickmeier | |
| D213,899 | S | 4/1969 | Rickmeier | |
| 3,841,298 | A | 10/1974 | Sellors | |
| 4,389,946 | A * | 6/1983 | Hwang | A47C 9/10 |
| | | | | 108/115 |
| 4,557,200 | A * | 12/1985 | Geschwender | A47B 23/001 |
| | | | | 248/439 |
| 4,779,605 | A | 10/1988 | Smith | |
| 4,884,551 | A | 12/1989 | Hait | |
| D305,972 | S | 2/1990 | Pearce | |
| 4,920,873 | A | 5/1990 | Stevens | |
| 5,119,799 | A | 6/1992 | Cowan | |
| 5,119,800 | A | 6/1992 | Roberts | |
| 5,203,257 | A * | 4/1993 | Goad | H05B 3/82 |
| | | | | 126/369 |
| 5,287,800 | A | 2/1994 | Orednick | |
| 5,467,697 | A * | 11/1995 | Hunziker | A47J 36/24 |
| | | | | 99/449 |
| 5,517,903 | A | 5/1996 | Kaufman | |
| 5,819,640 | A | 10/1998 | Cuomo | |
| 5,921,513 | A * | 7/1999 | Skvorecz | B65D 7/20 |
| | | | | 248/153 |
| 5,992,406 | A | 11/1999 | Lelle | |
| 6,234,068 | B1 * | 5/2001 | Sherman | A47J 36/2477 |
| | | | | 99/449 |
| 6,779,466 | B2 * | 8/2004 | Shabram, Jr. | A47B 3/10 |
| | | | | 108/115 |
| 6,892,721 | B2 | 5/2005 | Chen | |
| 6,951,213 | B2 * | 10/2005 | Coleman | A47J 37/0704 |
| | | | | 126/41 R |
| 6,955,327 | B1 * | 10/2005 | Skvorecz | A47J 36/34 |
| | | | | 248/153 |
| 7,175,033 | B1 | 2/2007 | Riopel | |
| 7,337,728 | B2 * | 3/2008 | Shabram, Jr. | A47B 3/10 |
| | | | | 108/115 |
| 7,765,939 | B2 * | 8/2010 | Chen | A47B 3/08 |
| | | | | 108/127 |
| D626,377 | S | 11/2010 | Contreras | |
| 7,828,160 | B2 | 11/2010 | Lin | |
| 7,934,494 | B1 | 5/2011 | Schneider | |
| 8,172,191 | B1 * | 5/2012 | Zimbalatti | F16M 11/10 |
| | | | | 248/688 |
| 9,138,098 | B1 | 9/2015 | Sun | |
| 9,414,712 | B2 | 8/2016 | Skvorecz | |
| 9,517,858 | B2 | 12/2016 | Skvorecz | |
| 9,539,677 | B2 | 1/2017 | Skvorecz | |
| 9,861,228 | B1 * | 1/2018 | Fariello | A47J 36/2405 |
| 9,943,186 | B2 | 4/2018 | Leonard | |
| 10,307,015 | B1 | 6/2019 | Shane | |
| 10,478,014 | B2 | 11/2019 | Revely | |
| 11,181,278 | B2 * | 11/2021 | Cuffaro | F24C 3/085 |
| D951,020 | S | 5/2022 | Zemel | |
| 11,974,695 | B1 * | 5/2024 | Cuffaro | A47J 37/0763 |
| 11,986,126 | B1 * | 5/2024 | Klein | A47J 36/24 |
| 2002/0020304 | A1 * | 2/2002 | Reynolds | A47J 36/2405 |
| | | | | 99/450 |
| 2003/0070591 | A1 * | 4/2003 | Shabram, Jr. | A47B 3/0916 |
| | | | | 108/35 |
| 2003/0192525 | A1 | 10/2003 | Ruiseco | |
| 2004/0020373 | A1 | 2/2004 | Chen | |
| 2005/0167381 | A1 * | 8/2005 | Fariello | A47J 36/24 |
| | | | | 211/195 |
| 2009/0258127 | A1 | 10/2009 | Holtz | |
| 2011/0017079 | A1 | 1/2011 | Wall | |
| 2014/0069284 | A1 * | 3/2014 | Zhou | A47J 39/02 |
| | | | | 99/483 |
| 2015/0040777 | A1 | 2/2015 | Leonard | |
| 2015/0250357 | A1 * | 9/2015 | Zhitnitsky | F16M 11/38 |
| | | | | 248/176.2 |
| 2021/0059468 | A1 * | 3/2021 | Amirault | A47J 36/2405 |
| 2021/0131668 | A1 * | 5/2021 | Sherrard | F24C 3/008 |

FOREIGN PATENT DOCUMENTS

| | | |
|---|---|---|
| CA | 2254963 A1 | 11/1997 |
| CA | 2459700 A1 | 9/2005 |
| CA | 2706950 A1 | 10/2011 |
| KR | 101347535 B1 | 1/2014 |
| WO | 2001027536 A1 | 4/2001 |
| WO | 2007021341 A2 | 2/2007 |
| WO | 2020223823 A1 | 11/2020 |

* cited by examiner

FOOD TRAY CHAFING STAND WITH HINGING LEGS

BACKGROUND

Current chafing stands include metal wire stands with wire legs. The stand defines an opening to support a tray therein. While the existing metal wire chafing stands are made from a material which is intended to be reusable, the stands often end up in the trash after one or a few uses. Furthermore, the design of current stands make them difficult to produce for the simplicity of their designs. Current chafing stands are also bulky and have no way storing them in an efficient space.

SUMMARY

Various implementations include a food tray stand. The stand includes a body and two or more legs. The body has a first surface and a second surface opposite and spaced apart from the first surface. The first surface defines a tray opening extending to the second surface. The two or more legs are hingedly coupled to the body by a living hinge. Each of the two or more legs is hingedly movable between an extended position and a retracted position. Each of the two or more legs extends away from the second surface in the extended position and is at least partially disposable within the tray opening in the retracted position.

In some implementations, the two or more legs includes four legs.

In some implementations, each of the two or more legs is fully disposable within the tray opening in the retracted position.

In some implementations, the second surface of the body defines a concavity. In some implementations, the first surface of the body of a first stand is at least partially disposable within the concavity of a second stand.

In some implementations, the stand further includes a base separately formed from the body and the two or more legs. In some implementations, one of the base or the two or more legs defines one or more coupling openings and an other of the two or more legs or the base includes one or more coupling protrusions. Each of the one or more coupling protrusions is engageable with a different one of the one or more coupling openings to couple the base to the two or more legs. In some implementations, the base defines the one or more coupling openings and the two or more legs includes the one or more coupling protrusions. In some implementations, the one or more coupling openings are keyhole openings and the one or more protrusions includes a stem and a distal head. In some implementations, the distal head and the stem each have a largest width as measured perpendicular to a plane that includes a path of movement of the respective leg when the leg moves between the extended position and the retracted position. In some implementations, the largest width of the distal head is greater than the largest width of the stem.

In some implementations, when the two or more legs are in the retracted position, the base is at least partially disposable within the tray opening. in some implementations, the base is fully disposable within the tray opening.

In some implementations, the base defines one or more nesting openings. In some implementations, when the two or more legs are in the retracted position and the base is at least partially disposed within the tray opening, at least one of the two or more legs is at least partially disposable within the one or more nesting openings. In some implementations, the one or more nesting opening includes two or more nesting openings. In some implementations, each of the two or more legs is at least partially disposable within a different one of the two or more nesting openings.

In some implementations, the base defines at least one canned cooking fuel opening sized to receive a canned cooking fuel. In some implementations, the at least one canned cooking fuel opening has a diameter, wherein the diameter is in the range of 2.0 inches to 6.0 inches.

In some implementations, the body and the two or more legs include a polymer. In some implementations, the polymer includes polypropylene. In some implementations, the polymer includes high impact polystyrene.

In some implementations, the body and the two or more legs are integrally formed.

In some implementations, the body defines one or more utensil holders. In some implementations, the one or more utensil holders are utensil openings defined by the first surface of the body and extending to the second surface of the body.

In some implementations, the tray opening includes a first portion and a second portion. The first portion of the tray opening is wider in at least one dimension than the second portion of the tray opening such that a ledge is formed at the intersection of the first portion and the second portion of the tray opening.

BRIEF DESCRIPTION OF DRAWINGS

Example features and implementations of the present disclosure are disclosed in the accompanying drawings. However, the present disclosure is not limited to the precise arrangements and instrumentalities shown. Similar elements in different implementations are designated using the same reference numerals.

DETAILED DESCRIPTION

The devices, systems, and methods disclosed herein provide for a food tray stand. The stand can include a body with a tray opening for supporting a tray. The stand can include a plurality of legs that are hingedly coupled to the body by a living hinge. A base can be removably couplable to the distal ends of the legs to hold the legs in an extended position. The base can include one or more canned cooking fuel openings for supporting canned cooking fuel containers below a tray disposed within the tray opening.

When the legs are rotated about the living hinge to a retracted position, the legs are disposed within the tray opening. The base can also be sized to be disposed within the tray opening and can include nesting openings sized such that each of the legs is disposable within a different one of the nesting openings when the base is disposed within the tray opening.

The food tray stands disclosed herein can be made of an easily recyclable material such that the stand can be disposable after use.

Various implementations include a food tray stand. The stand includes a body and two or more legs. The body has a first surface and a second surface opposite and spaced apart from the first surface. The first surface defines a tray opening extending to the second surface. The two or more legs are hingedly coupled to the body by a living hinge. Each of the two or more legs is hingedly movable between an extended position and a retracted position. Each of the two or more legs extends away from the second surface in the extended position and is at least partially disposable within the tray opening in the retracted position.

Figure 1:
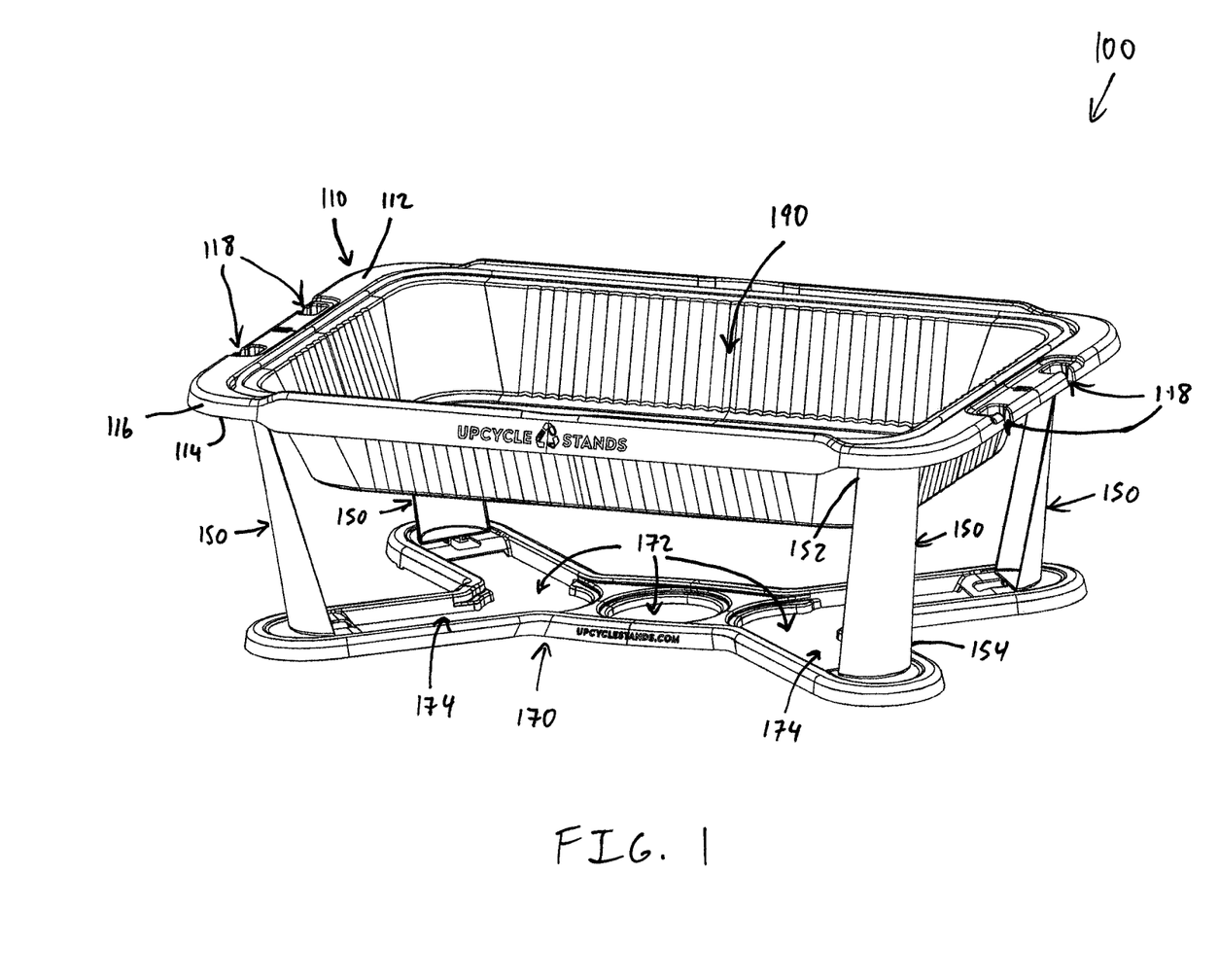
FIG. 1 shows a top perspective view of a food tray stand with a serving tray and with the legs in the extended position, according to one implementation.
Figure 2:
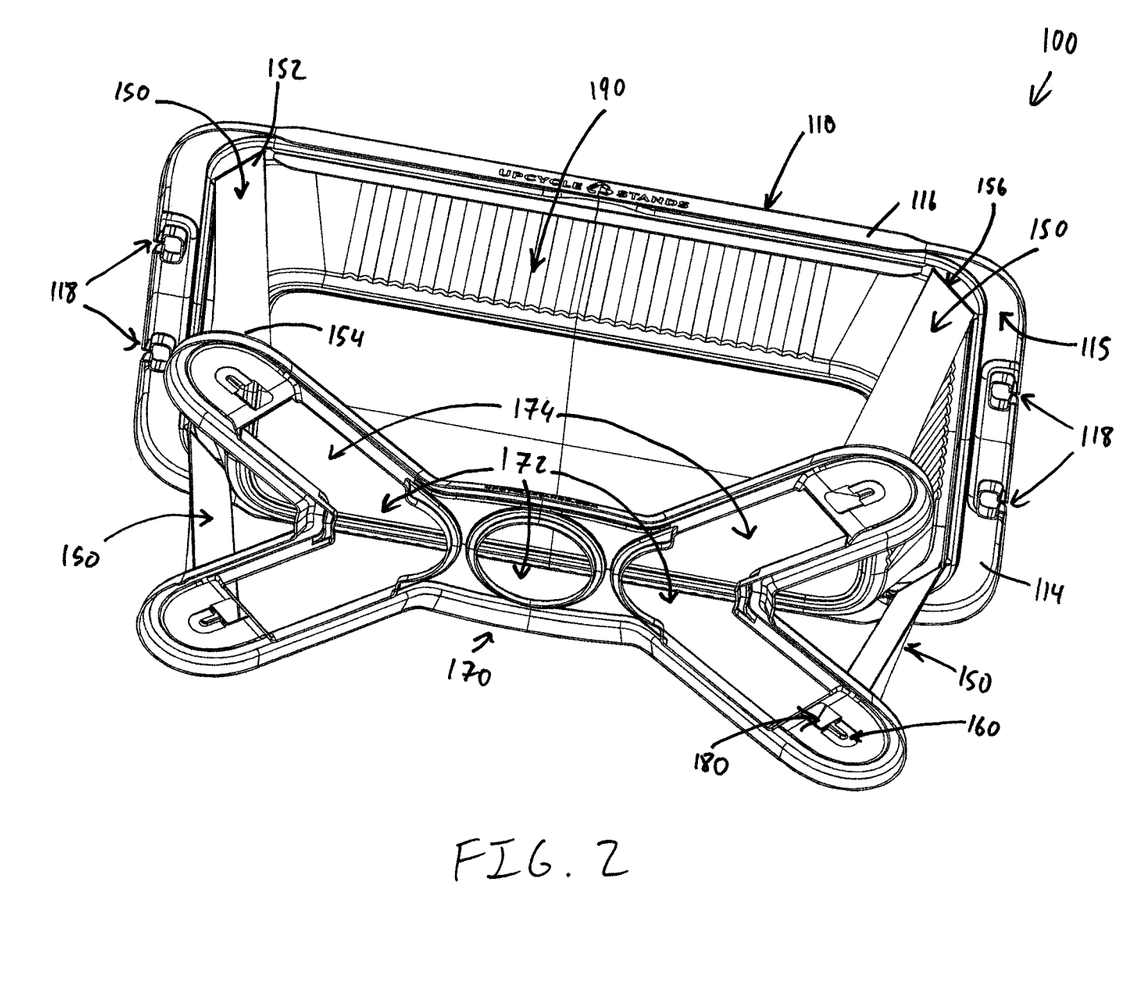
FIG. 2 shows a bottom perspective view of the food tray stand of FIG. 1 with a serving tray and with the legs in the extended position.
Figure 3:
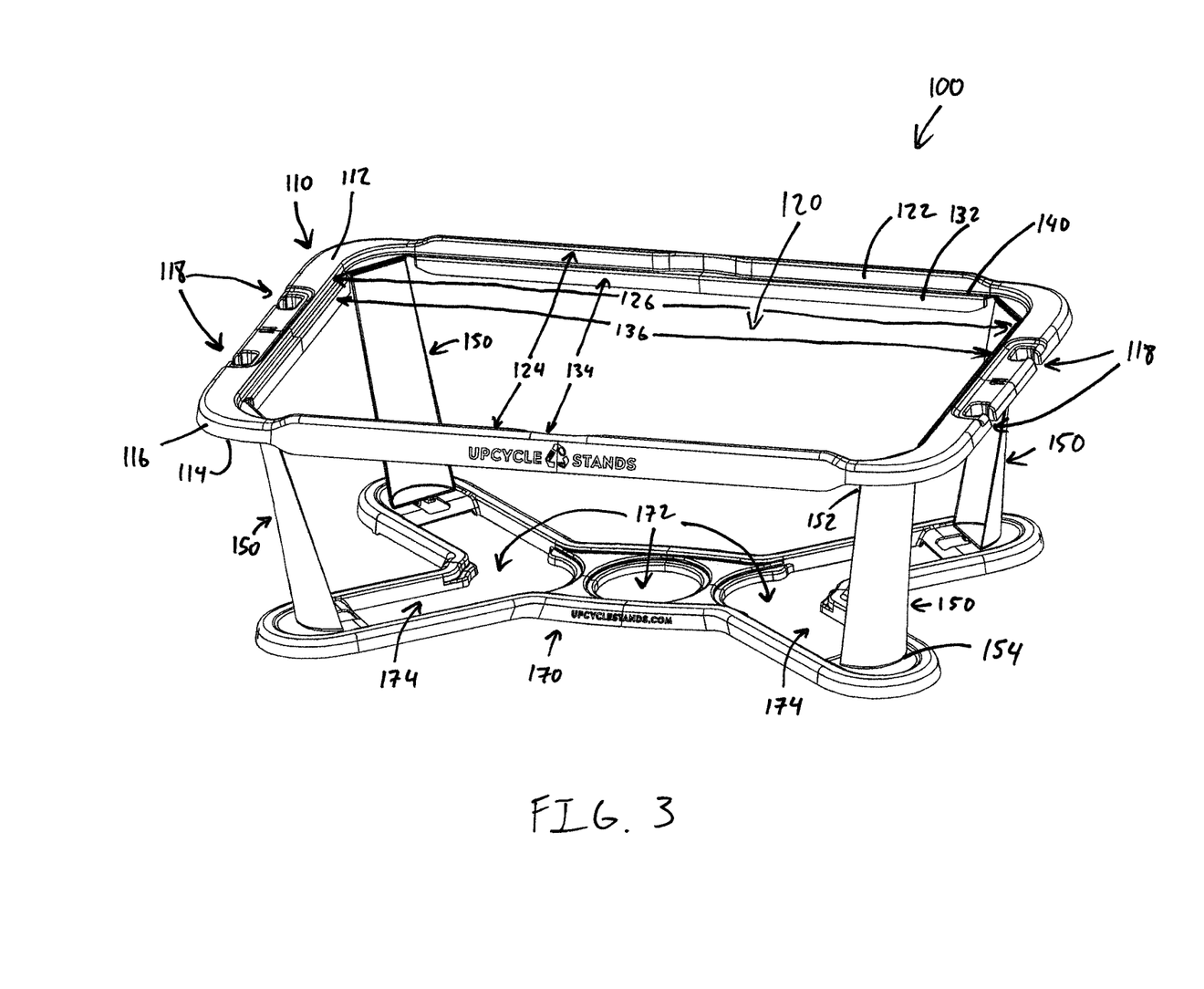
FIG. 3 shows a top perspective view of the food tray stand of FIG. 1 without a serving tray and with the legs in the extended position.
Figure 4:
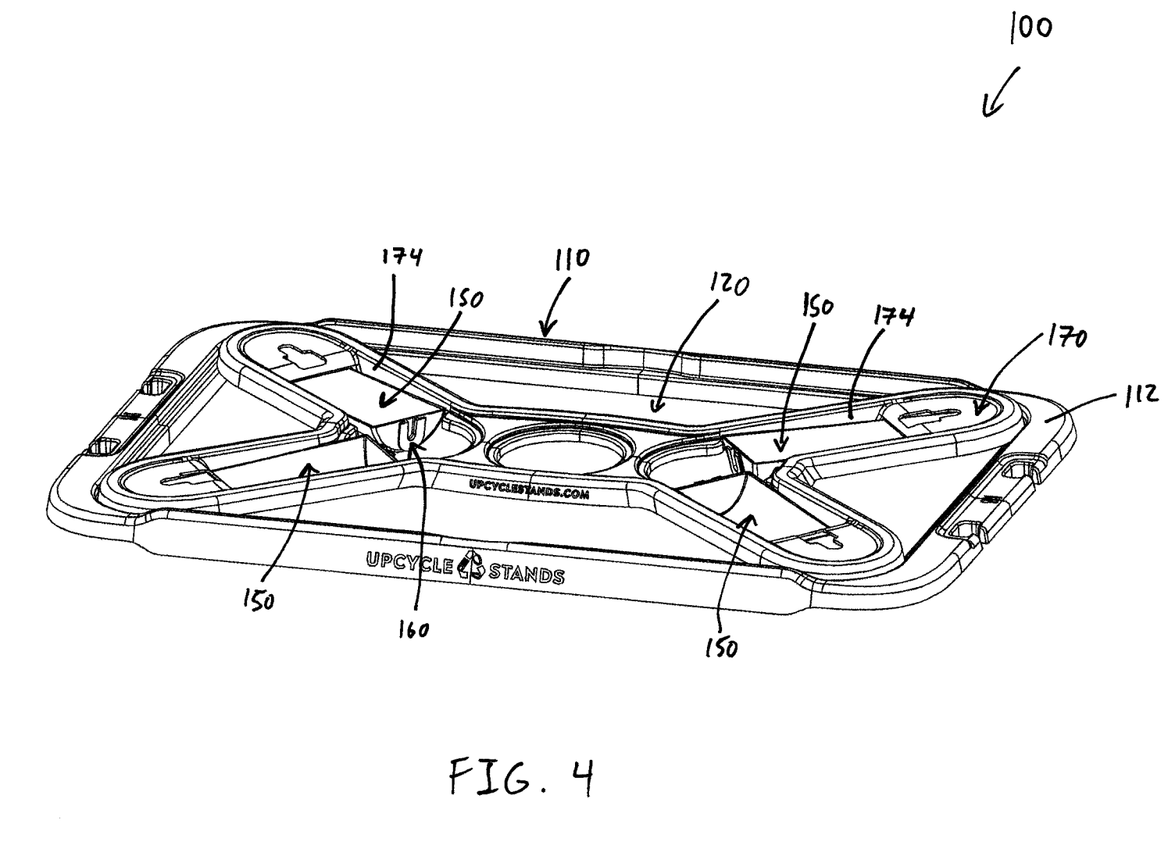
FIG. 4 shows a top perspective view of the food tray stand of FIG. 1 with the legs in the retracted position and the base disposed within the tray opening.
Figure 5:
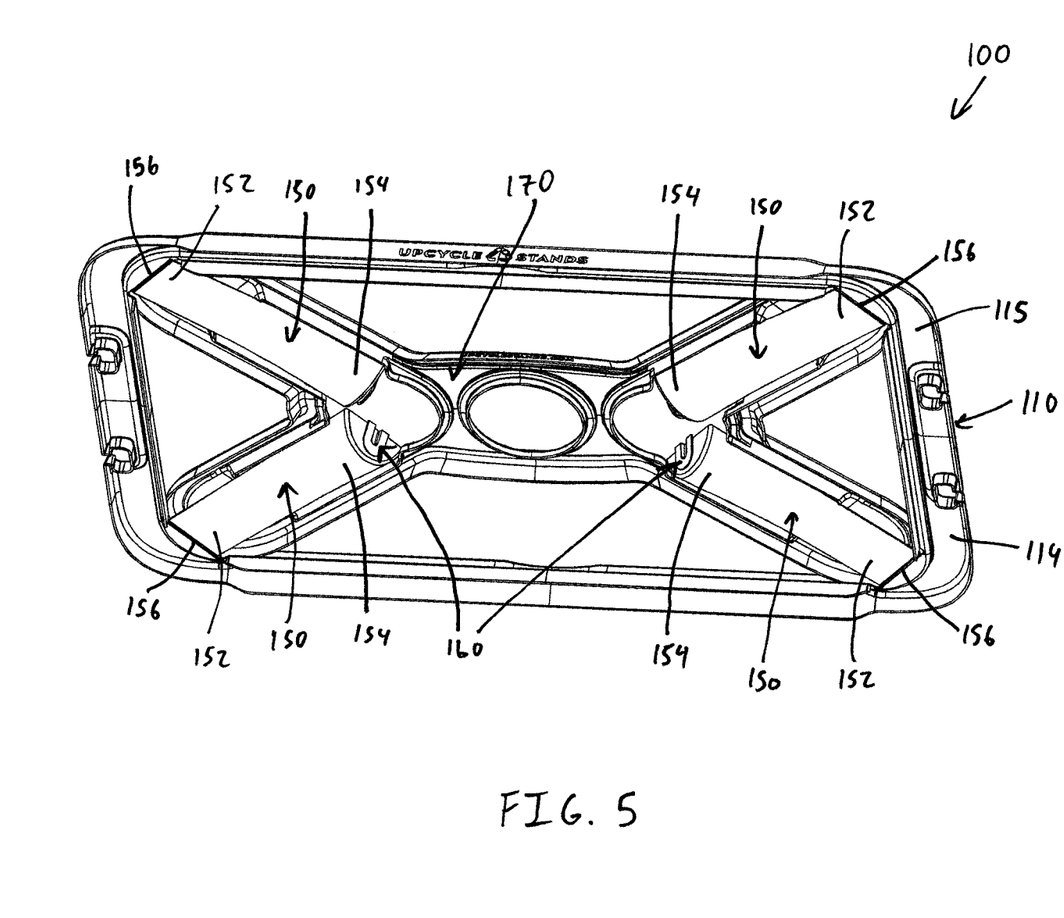
FIG. 5 shows a bottom perspective view of the food tray stand of FIG. 1 with the legs in the retracted position and the base disposed within the tray opening.
Figure 6:
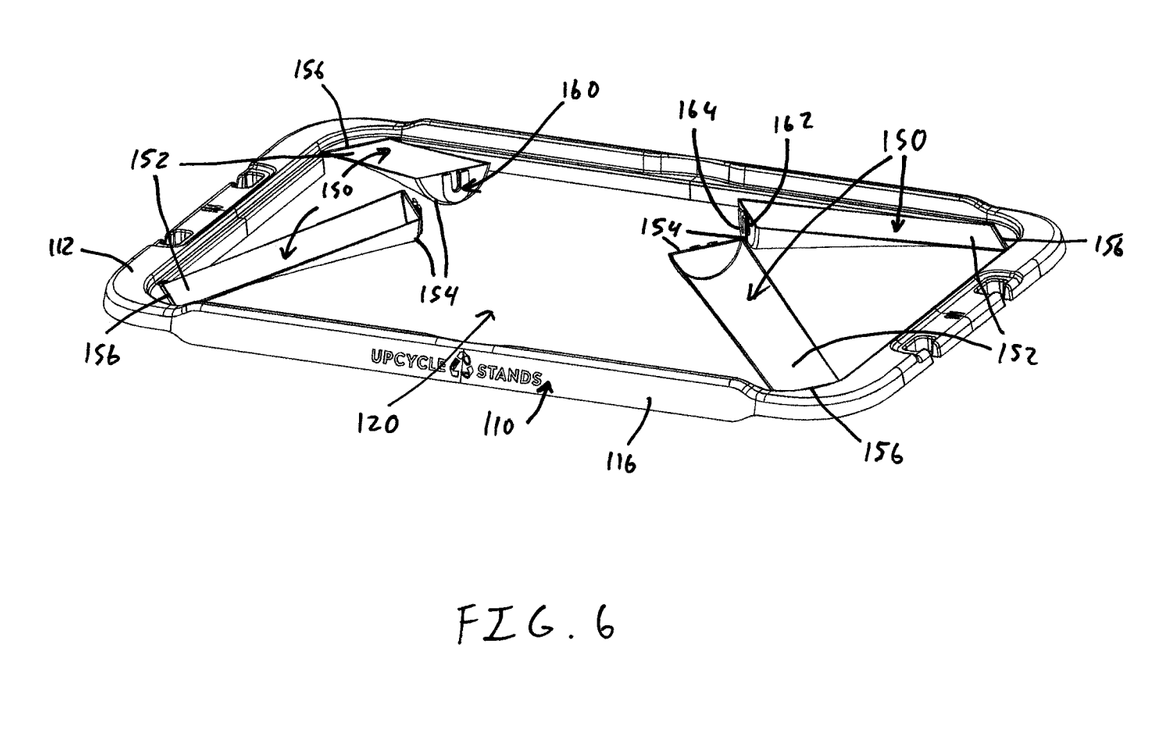
FIG. 6 shows a top perspective view of the food tray stand of FIG. 1 with the legs in the retracted position and without the base.
Figure 7:
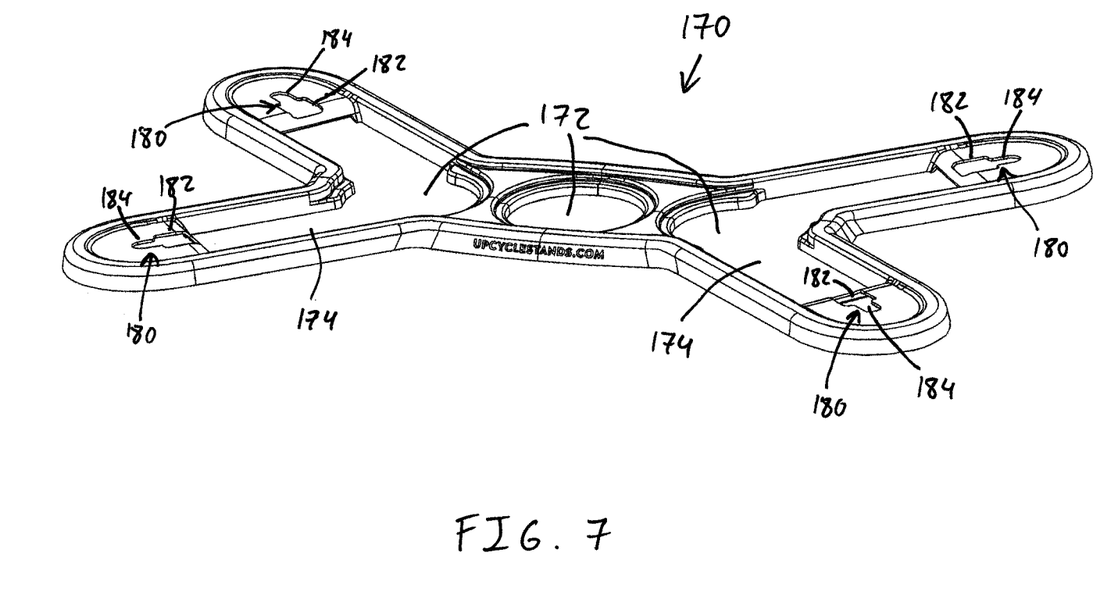
FIG. 7 shows a top perspective view of the base of the stand of FIG. 1.

FIGS. 1-7 show a food tray stand 100 including many aspects according to various implementations disclosed herein. The stand 100 includes a body 110, four legs 150, and a base 170.

The body 110 has a first surface 112 and a second surface 114 opposite and spaced apart from the first surface 112. The body 110 shown in FIGS. 1-6 is rectangular when viewed perpendicularly to the first surface 112. However, in some implementations, the body is circular, ovate, triangular, square, or any other closed shape.

The first surface 112 defines a tray opening 120 extending to the second surface 114. The tray opening 120 includes a first portion 122 adjacent the first surface 112 of the base 110 and a second portion 132 intersecting the first portion 122 and adjacent the second surface 114 of the body 110. The first portion 122 of the tray opening 120 has a first width 124 and a first length 126 as measured perpendicular to each other and parallel to a plane defined by the first surface 112 of the body 110. The second portion 132 of the tray opening 120 has a second width 134 and a second length 136 as measured perpendicular to each other and parallel to a plane defined by the first surface 112 of the body 110.

The first width 124 is greater than the second width 134 and the first length 126 is greater than the second length 136. The second portion 132 of the tray opening 120 is centrally located relative to the first portion 122 of the tray opening 120 when viewed perpendicular to the first surface 112 of the body 110. The difference between the first width 124 and the second width 134, and the first length 126 and the second length 136, forms a parametrical ledge 140 along the intersection of the first portion 122 and the second portion 132 of the tray opening 120. The first portion 122 of the tray opening 120 is sized to receive the lip or flange of a serving tray 190 therein. However, the second width 134 and the second length 136 of the second portion 132 of the tray opening 120 are less than the width and length of the lip or flange of the serving tray 190 such that the lip or flange of the serving tray 190 cannot pass through the second portion 132 of the tray opening 120. Thus, the lip or flange of the serving tray 190 is able to rest within the first portion 122 of the tray opening 120 on the parametrical ledge 140.

Although the shape of the tray opening 120 shown in FIGS. 1-6 is rectangular when viewed perpendicularly to the first surface 112, in some implementations, the tray opening is circular, ovate, triangular, square, or any other closed shape.

Although the first width 124 is larger than the second width 134, and the first length 126 is larger than the second length 136, in the body 110 shown in FIGS. 1-6, in some implementations, only the first width is larger than the second width, or only the first length is larger than the second length, such that a ledge is only formed along only one or more portions of the intersection of the first portion and the second portion. In some implementations in which the body is circular, the diameter of the first portion is larger than the second diameter. In some implementations, one or more dimensions of the first portion are larger than the corresponding one or more dimensions of the second portion such that a ledge is formed along at least a portion of the intersection of the first portion and the second portion of the tray opening.

In some implementations, the tray opening is sized to receive two or more serving trays within the single tray opening. In some implementations, the body defines two or more separate tray openings each for receiving one or more serving trays.

The body 110 shown in FIGS. 1-6 further includes four utensil holders 118 in the form of utensil holder openings. Each of the utensil holder openings 118 is defined by the first surface 112 of the body 110 and extend to the second surface 114 of the body 110. Each of the utensil holder openings 118 overlaps an edge 116 of the body 110 such that the edge 116 of the body 110 partially defines the utensil holder opening 118. This forms a utensil holder opening 118 that is open to the edge 116 of the body 110 such that a utensil can be inserted through the open portion of the utensil holder opening 118 along the edge 116 of the body 110. Although the utensil holders 118 of the body 110 shown in FIGS. 1-6 are utensil holder openings, in some implementations, one or more of the utensil holders are protrusions such as hooks or knobs. In some implementations, one or more utensil holders are slots defined by a surface of the body but not extending fully through the body. In some implementations, the body includes any number of one or more utensil holders.

Each of the four legs 150 shown in FIGS. 1-6 has a proximal end 152 and a distal end 154 that is distal to the proximal end 152. The proximal end 152 of each of the legs 150 is integrally or monolithically formed with the body 110 of the stand 100 to form a living hinge 156. Each of the hingedly coupled legs 150 is movable between an extended position and a retracted position. In the extended position, each of the four legs 150 extends away from the second surface 114 of the body 110. In the retracted position, each of the four legs 150 is fully disposable within the tray opening 120.

The proximal ends 152 of the four legs 150 shown in FIGS. 1-6 are coupled to portions of the body 110 along the tray opening 120, but in some implementations, the legs are hingedly coupled to any other portion of the body. Although the legs 150 shown in FIGS. 1-6 are hingedly coupled to the body 110 by living hinges 156, in some implementations, one or more of the legs is hingedly coupled to the body by a traditional hinge or any other hinging mechanism that allows the leg to rotate relative to the body. In some implementations, one or more of the legs are separately formed from the body.

In some implementations, one or more of the legs is only partially disposable within the tray opening in the retracted position.

In some implementations, the stand includes two legs that are broad enough to be stable in use. In some implementations, the stand includes any number of one or more legs.

The distal end 154 of each of the legs 150 includes a coupling protrusion 160 extending therefrom. The coupling protrusion 160 includes a stem 162 that is coupled to the distal end 154 of the leg 150 and a distal head 164 coupled to the stem 162. The distal head 164 and the stem 162 each have a largest width as measured perpendicular to a plane that includes the path of movement of the respective leg 150 when the leg 150 moves between the extended position and the retracted position. The largest width of the distal head 164 is greater than the largest width of the stem 162.

The base 170 shown in FIGS. 1-5 and 7 is separately formed from the body 110 and the legs 150. The base 170 is engageable with the legs 150 to stabilize the legs 150 and body 110 and to prevent over extension of the legs 150 beyond the extended position. However, in some implementations, the stand does not include a base.

The base 170 defines four coupling openings 180 that are shaped as keyhole openings. Each of the keyhole shaped coupling openings 180 includes a wide portion 182 and a narrow portion 184 that is narrower than the wide portion 182. The wide portion 182 is sized such that the distal head 164 of the coupling protrusion 160 can be fully inserted through the wide portion 182 of the coupling opening 180. The narrow portion 184 of the coupling opening 180 is sized such that the stem 162 of the coupling protrusion 160 can be inserted into the narrow portion 184 but the distal head 164 is too wide to be inserted through the narrow portion 184. The keyhole shaped coupling openings 180 are each located such that a distal head 164 of a coupling protrusion 160 of a separate one of the four legs 150 is insertable into and through the wide portion 182 of the coupling opening 180. Each of the coupling openings 180 are oriented such that further movement of the respectively engaged leg 150 toward the extended position causes the stem 162 of the coupling protrusion 160 to be inserted into the narrow portion 184 of the coupling opening 180. Because the distal heads 164 of the coupling protrusions 160 cannot pass through the narrow portions 184 of the coupling openings 180, each of the four legs 150 is engaged with the base 170 to removably couple the body 110 and legs 150 to the base 170.

Although the base 170 shown in FIGS. 1-5 and 7 defines the coupling openings 180 and the legs 150 include the coupling protrusions 160, in some implementations, the legs define the coupling openings, and the base includes the coupling protrusions. In some implementations, each of the base and the legs each define one or more coupling openings, and the base and the legs each include one or more coupling protrusions. In some implementations, the coupling protrusions and the coupling openings are any shape that are engageable with each other to couple the legs to the base. In some implementations, the legs and/or the base include any fastener known in the art, such as nails, tacks, screws, bolts, staples, rivets, adhesive, tape, hook-and-loop, ties, hooks, or any other fastener capable of coupling the base to the legs. Although the distal ends 154 of the legs 150 include the coupling protrusions 160 in FIGS. 1-6, in some implementations, any portion of the legs include the coupling protrusions and/or the coupling openings.

The base 170 further defines three canned cooking fuel opening 172 sized to each receive a canned cooking fuel container. The canned cooking fuel openings 172 are located on the base 170 such that canned cooking fuel containers disposed within the canned cooking fuel openings 172 evenly distribute enough heat to a serving tray 190 disposed within the tray opening 120 to keep food within the serving tray 190 at a safe temperature for human consumption.

Each of the canned cooking fuel openings 172 shown in FIGS. 1-5 and 7 has a diameter in the range of 3.25 inches to 3.75 inches. However, in some implementations, each of the canned cooking fuel openings has a diameter in the range of 3.0 inches to 4.5 inches. In some implementations, each of the canned cooking fuel openings has a diameter in the range of 2.0 inches to 6.0 inches, such as 2.0 inches, 2.125 inches, 2.25 inches, 2.375 inches, 2.5 inches, 2.625 inches, 2.75 inches, 2.875 inches, 3.0 inches, 3.125 inches, 3.25 inches, 3.375 inches, 3.5 inches, 3.625 inches, 3.75 inches, 3.875 inches, 4.0 inches, 4.125 inches, 4.25 inches, 4.375 inches, 4.5 inches, 4.625 inches, 4.75 inches, 4.875 inches, 5.0 inches, 5.125 inches, 5.25 inches, 5.375 inches, 5.5 inches, 5.625 inches, 5.75 inches, 5.875 inches, or 6.0 inches. Although the base 170 of the stand 100 shown in FIGS. 1-5 and 7 includes three canned cooking fuel openings 172, in some implementations, the base of the stand includes any number of one or more canned cooking fuel openings.

Similar to the legs 150, the base 170 shown in FIGS. 1-5 and 7 is also disposable within the tray opening 120 during storage. The base 170 shown in FIGS. 1-5 and 7 defines two nesting openings 174 each sized to receive two legs 150 in the retracted position. The base 170 is sized such that, when the legs 150 are in the retracted position, the base 170 is fully disposable within the tray opening 120. When the legs 150 are in the retracted position and the base 170 is disposed within the tray opening 120, the legs 150 are fully disposable within the nesting openings 174 such that the four legs 150 and the base 170 are all fully disposed within the tray opening 120. Thus, all four legs 150, the base 170, and the body 110 can be configured to have the same overall footprint as the body 110 alone.

Although the base 170 shown in FIGS. 1-5 and 7 is fully disposable within the tray opening 120 of the body 110, in some implementations, the base is only partially disposable within the tray opening. Although the legs 150 shown in FIGS. 1-5 are fully disposable within the nesting openings 174 of the base 170, in some implementations, the legs are only partially disposable within the nesting openings. Although the base 170 shown in FIGS. 1-5 and 7 include two nesting openings 174 each configured to receive two legs 150, in some implementations, the base includes any number of one or more nesting openings each configured to receive any number of one or more legs.

The body 110, the four legs 150, and the base 170 each comprise polypropylene. However, in some implementations, the body 110, the four legs 150, and the base 170 each comprise high impact polystyrene. Polypropylene and high impact polystyrene are easily recyclable materials that allow the user to recycle the stand 100 after using it. A stand 100 made of polypropylene or high impact polystyrene is also cheaper than a stand made of metal, both because of material costs and from a manufacturing standpoint.

Although the body 110, the four legs 150, and the base 170 shown in FIGS. 1-7 each comprise polypropylene or high impact polystyrene, in some implementations, the body, the four legs, and/or the base comprise any polymer.

Two or more of the stands 100 disclosed herein can be stackable with each other for space saving and stability during storage. The second surface 114 of the body 110 defines a concavity 115 extending around and adjacent the tray opening 120 and adjacent the edge 116 of the body 110. The first surface 112 of the body 110 defines a fillet or chamfer around the outer perimeter along the edges 116 of the body 110 and a fillet or chamfer around the inner perimeter along the tray opening 120. The edges 116 of the body 110 can also be slightly tapered from widest adjacent the second surface 114 to narrowest adjacent the first surface 112. These features allow the first surface 112 of the body 110 of a first stand 100 to be at least partially disposable within the concavity 115 of a second stand 100.

However, it is understood that, in some implementations, the first surface can include the concavity, the second surface can include the fillets and chamfers, and/or the edges of the body can tapered from widest adjacent the first surface to narrowest adjacent the second surface. In some implementations, the body can include one or more of the concavity, the fillets and chamfers, and/or the tapered edges and still allow a first stand to be at least partially disposable within a second stand. In some implementations, the body does not include any of the concavity, the fillets and chamfers, and/or the tapered edges. In some implementations, the stands are not nestable.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device are disclosed herein, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A food tray stand, the stand comprising:
    a body having a first surface and a second surface opposite and spaced apart from the first surface, wherein the first surface defines a tray opening extending to the second surface;
    two or more legs hingedly coupled to the body by a living hinge, wherein each of the two or more legs is hingedly movable between an extended position and a retracted position, wherein each of the two or more legs extends away from the second surface in the extended position and is at least partially disposable within the tray opening in the retracted position; and
    a base separately formed from the body and the two or more legs,
    wherein when the two or more legs are in the retracted position, the base is at least partially disposable within the tray opening, and
    wherein the base defines one or more nesting openings, wherein when the two or more legs are in the retracted position and the base is at least partially disposed within the tray opening, at least one of the two or more legs is at least partially disposable within the one or more nesting openings.

2. The stand of claim 1, wherein the two or more legs comprises four legs.

3. The stand of claim 1, wherein each of the two or more legs is fully disposable within the tray opening in the retracted position.

4. The stand of claim 1, wherein one of the base or the two or more legs defines one or more coupling openings and another of the two or more legs or the base includes one or more coupling protrusions, wherein each of the one or more coupling protrusions is engageable with a different one of the one or more coupling openings to couple the base to the two or more legs.

5. The stand of claim 4, wherein the base defines the one or more coupling openings and the two or more legs includes the one or more coupling protrusions.

6. The stand of claim 4, wherein the one or more coupling openings are keyhole openings and the one or more protrusions includes a stem and a distal head, wherein the distal head and the stem of each respective one of the two or more legs each have a largest width as measured perpendicular to a plane that includes a path of movement of the respective one of the two or more legs when the respective one of the two or more legs moves between the extended position and the retracted position, wherein the largest width of the distal head is greater than the largest width of the stem.

7. The stand of claim 1, wherein the base is fully disposable within the tray opening.

8. The stand of claim 1, wherein the one or more nesting opening comprises two or more nesting openings, wherein each of the two or more legs is at least partially disposable within a different one of the two or more nesting openings.

9. The stand of claim 1, wherein the base defines at least one canned cooking fuel opening sized to receive a canned cooking fuel.

10. The stand of claim 9, wherein the at least one canned cooking fuel opening has a diameter, wherein the diameter is in the range of 2.0 inches to 6.0 inches.

11. The stand of claim 1, wherein the body and the two or more legs comprise a polymer.

12. The stand of claim 11, wherein the polymer comprises polypropylene or high impact polystyrene.

13. The stand of claim 1, wherein the body and the two or more legs are integrally formed.

14. The stand of claim 1, wherein the body defines one or more utensil holders.

15. The stand of claim 14, wherein the one or more utensil holders are utensil openings defined by the first surface of the body and extending to the second surface of the body.

16. The stand of claim 1, wherein the tray opening includes a first portion and a second portion, wherein the first portion of the tray opening is wider in at least one dimension than the second portion of the tray opening such that a ledge is formed at the intersection of the first portion and the second portion of the tray opening.

* * * * *